Patented Nov. 17, 1942

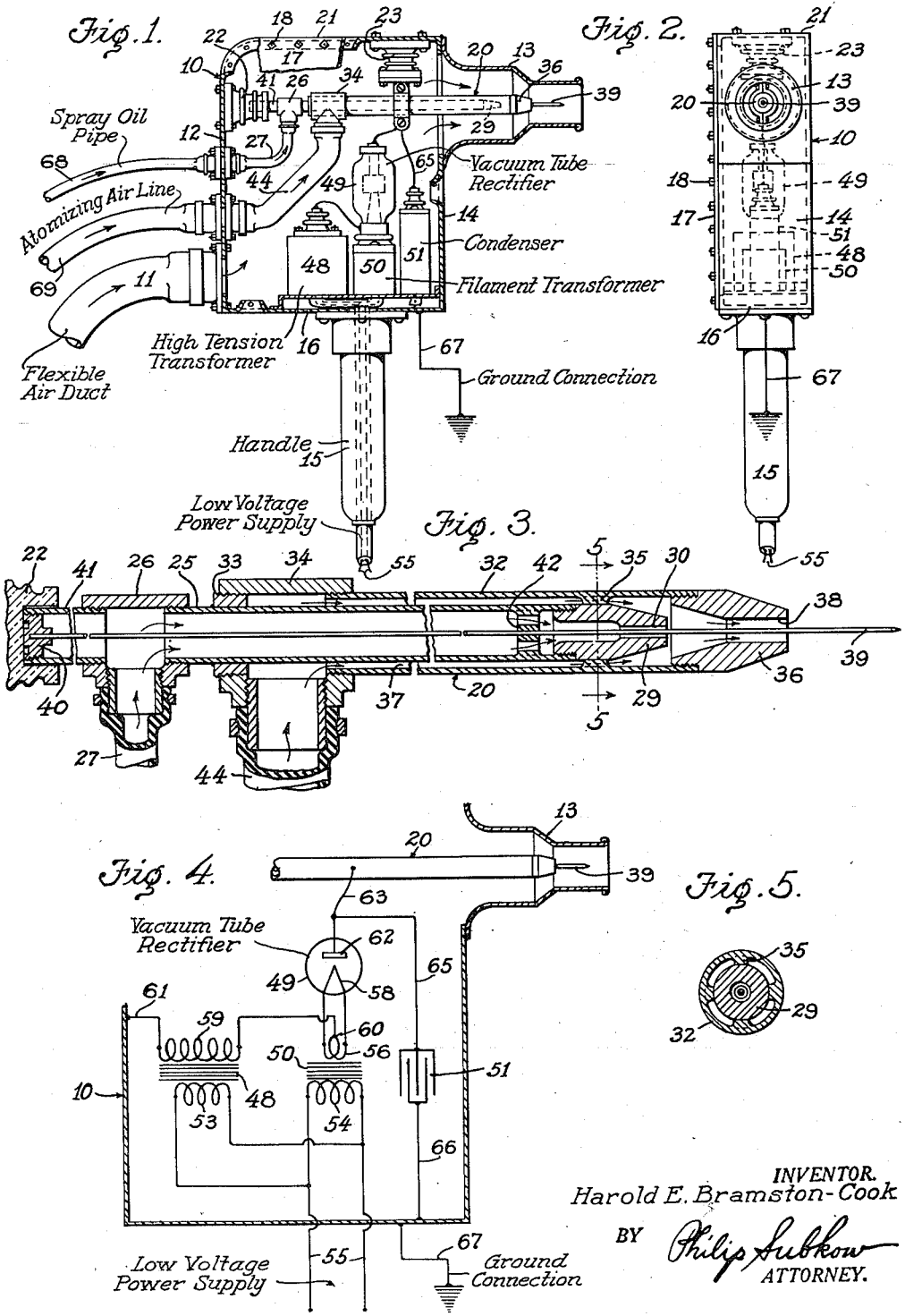

2,302,289

UNITED STATES PATENT OFFICE 2,302,289

ELECTRIFIED SPRAY METHOD AND APPARATUS

Harold E. Bramston-Cook, Santa Monica, Calif., assignor to Union Oil Company of California, Los Angeles, Calif., a corporation of California Application December 6, 1938, Serial No. 244,194

6 Claims. (Cl. 21—2)

This invention relates to liquid sprayers and particularly to sprayers for the application of insecticidal and fungicidal oils to plants.

In the conventional method of applying such oils to plants an emulsion of the oil in water is usually made and the emulsion sprayed upon the plants with the result that upon evaporation of the water, the oil is left in the form of an extremely thin film of fairly uniform thickness and distribution.

However, the employment of water as a carrier for the spray is not always desirable or permissible. For example, in pest control in deciduous fruit growing areas such as the Pacific Northwest, the freezing temperatures occasionally encountered during the spraying season would, if immediately following the application of a water emulsion, result in severe damage to the trees. Also, in certain locations sufficient water for the preparation of a spray oil emulsion is not always available at the required time.

The efficient and effective application of spray oils to plants, particularly, trees, by mechanical atomization of the spray oil alone without a water carrier, has heretofore presented several difficulties. When sufficiently high velocities of the atomized liquid are employed to effectively reach the higher and more distant branches of trees, the velocity is such that the liquid particles tend to stream around the branches rather than to impinge upon them. When low velocity atomization is employed, the higher limbs of trees cannot be effectively reached without overapplication on the lower branches. It has also been found that the oil, even if finely atomized, quickly coalesces to form larger droplets which are unsuited to accomplishing an even distribution of the spray oil upon the plant surfaces and that, in all events, a substantial proportion of the spray fails to impinge upon any part of the plant or tree and is thus wasted.

It is, therefore, an object of this invention to present a method and apparatus for the efficient and effective application of spray oils to plants and to accomplish the same without employing extraneous carrier liquids.

The invention resides broadly in a method and apparatus for the atomization of spray liquids in the presence of an intense electric field whereby the resultant cloud of atomized liquid spray particles is electrified and causing said electrified atomized spray to move to the surfaces to be sprayed under the influence of an electric field.

Other objects and features of the invention will be evident hereinafter.

Referring to the drawing which illustrates one preferred embodiment of the invention, Fig. 1 is a side sectional elevation of the spray generating apparatus. Figure 2 is a front elevation of the apparatus of Figure 1. Figure 3 is a cross-sectional detail of the spray nozzle. Figure 4 is a wiring diagram of the electrical elements of the apparatus. Figure 5 is a cross-section of the spray nozzle taken on lines 5—5 of Figure 3.

The apparatus of the invention is as follows:

The body of this apparatus, as shown in Figures 1 and 2, comprises a substantially rectangular metal body or container 10 having an air inlet duct 11, attached at the lower rear end 12, an air and spray outlet nozzle 13 projecting forward from the upper end 14, and a handle 15 extending downward from the bottom 16 thereof. A removable side cover plate 17 adapted to allow ready access to the interior of the sprayer body container 10 is held in place by means of a plurality of studs as shown at 18.

On the interior of the enclosure 10, a spray nozzle 20 shown in enlarged detail in Figure 3, is supported from the inside back 12 and top 21 by means of insulators 22 and 23, respectively, extending into and coaxial with the outlet nozzle 13.

The spray nozzle 20, which is shown in cross-sectional detail of Figure 3, comprises an inner tube 25 terminating at the rear end in a T-connection 26 through which spray liquid is adapted to be supplied from the attached flexible tubing 27, and terminating at the forward end in an inner spray head 29 having an orifice 30 of reduced diameter. The nozzle 20 also comprises an outer concentric tube supported and connected, at the rear end, to the inner tubing 25 by means of a threaded bushing 33 and T-connection 34 and supported near the forward end by means of a perforate spider 35 best shown in section in Figure 5. The said outer tube 32 terminates at the forward end in an outer spray head 36 having an orifice 38 of reduced diameter. Extending coaxially throughout the length of the nozzle 20 and passing out through the orifices 30 and 38 is a pointed metal rod electrode 39. The said rod electrode is supported in its coaxial position by means of a threaded plug 40 in the nipple 41 which extends rearward from the T-connection 26, and near the forward end it is supported by the perforate centering spider 42. As stated before, spray liquid is adapted to be supplied to the inner spray head 29 through the inner tubing 25, flexible pipe 27 and T-connection 26, and also atomizing air or other suitable fluid under pressure is adapted to be supplied to the nozzle spray head 36 through a flexible pipe 44, T-connection 34 and through the annular space 37 between the inner and outer tubes 25 and 32, respectively. Flexible pipes 27 and 44 are made of insulating material such as rubber or duprene.

Also enclosed within the body 10, as shown in Figure 1, the wiring diagram of which is shown in Figure 4, is the electrical equipment adapted to supply a high tension unidirectional electric current to the nozzle assembly and to the central pointed electrode 39, the said equipment comprising a high tension transformer 48, vacuum tube rectifier 49, tube rectifier filament supply transformer 50 and high tension filter condenser 51.

Referring particularly to the wiring diagram of Figure 4, the primaries 53 and 54 of the transformers 48 and 50, respectively, are connected in parallel to insulated electrical conductors 55 which serve to carry the low tension current supply thereto and which enter the sprayer enclosure 10 through a conduit provided through the center of the handle 15. The secondary 56 of the filament transformer 50 is connected across the vacuum tube rectifier filament 58 and serves to supply the heating current thereto. The secondary 59 of the high tension setup transformer 48 is connected at one end to the rectifier filament by way of the filament transformer center tap 60 and at the other end to the metal sprayer body 10 at 61. The said body 10 being a conductor, the electrical circuit is completed therethrough to the metal outer nozzle 12. The anode 62 of the vacuum tube rectifier 49 is in turn connected to the nozzle assembly 20 and the central rod electrode 39 by way of conductor 63. The series high tension circuit comprising the body 10, high tension transformer secondary 59, and vacuum tube rectifier 49, serve to supply an unidirectional high potential between the nozzle electrode assembly 20, 39 and the outer nozzle 13. The high tension condenser 51 is connected across the above outlined circuit by means of conductors 65 and 66 for the purpose of substantially smoothing out or reducing the peak of the resultant unidirectional pulsations.

The body 10 of the sprayer is connected to a suitable grounded terminal by way of a flexible insulated conductor 67.

Flexible pipe 68 and flexible line 69 serve to supply spray-liquid and air, respectively, to the pipes 27 and 44 which lead to the before described spray nozzle 20. The air duct 11 serves to supply air under pressure from a suitable blower to the sprayer body 10 through which it passes to the outer nozzle 13.

The operation of the apparatus is as follows:

With the high potential supply set in operation an unidirectional electric potential is maintained between the nozzle electrode assembly 20, 39 and the outer electrode nozzle 13, preferably of sufficient gradient to produce a silent electric discharge or a corona discharge therebetween, particularly between the rod electrode 39 and nozzle 13. Spray liquid and air may then be supplied through the spray oil pipe 68 and the atomizing air line 69, respectively, to the nozzle assembly 20. The spray liquid passes therefrom through the inner tube 25 and issues from the orifice 30 in the nozzle head 29 in the form of a high velocity stream where it meets and mixes with air under pressure flowing through the annular space between the tubes 25 and 32. The resulting mixture of air and spray under pressure passes out of the spray head 36, with high turbulence, through the annular space formed between the orifice 38 and the rod electrode 39 in the form of a finely atomized stream.

As the thus formed stream of the air and atomized spray liquid mixture passes outward along the length of the rod electrode 39, it is subjected to the ionizing effect of the corona discharge from the said rod electrode whereby the finely divided liquid particles comprising the said atomized spray are each imparted electrical charges of like polarity and of substantially equal potential with respect to the outer nozzle electrode 13. The said outer nozzle electrode 13 being grounded through sprayer body 10 and the ground connection 67, the thus charged atomized liquid particles are, therefore, at high electric potentials of substantially equal value with respect to all grounded objects such as for example plants and trees. The effect of this charged state of the atomized liquid-air mixture is twofold. First, the thus formed equally charged liquid spray particles, in effect, tend to repel one another and thus resist coalescence, with the result that the thus produced electrified cloud of atomized spray liquid persists for a longer period of time, affording thereby better opportunty for its more uniform and effective contact with surfaces to be coated. Second, the said atomized liquid spray particles, being at a high potential with respect to all the surrounding grounded objects, will be attracted and tend to move toward and precipitate in a layer upon the nearest surfaces of such grounded objects.

Thus, for example, an electrified cloud of atomized spray liquid carrying a high potential positive charge as produced in the above described manner and directed toward the branches and leaves of a plant or tree carrying a high potential negative charge with respect to said electrified cloud of spray liquid, will be attracted to said branches and leaves and quickly precipitated thereon in the form of a thin uniformly distributed film of liquid.

While the electrical apparatus by way of illustration has been shown and described as adapted to impart positive electrical charges to the spray liquid, with respect to ground, the apparatus may obviously be arranged to impart negative charges to the spray liquid with respect to ground with equal effect.

When it is desirable or necessary to project the atomized spray liquid cloud for a considerable distance, this is more effectively accomplished by supplying a relatively large volume of air under suitable pressure through the flexible air duct 11 to the spray body 10, from which it flows through the annular space between the outer nozzle 13 and the spray nozzle assembly 20 and issues from the forward end of the outer nozzle 13 in the form of a stream of air of sufficient velocity to carry the atomized spray-liquid cloud to a greater distance than would be possible when relying upon the velocity of the atomized spray-liquid alone. This provision for projecting the atomized spray liquid cloud in a carrier stream of air is particularly advantageous when it is necessary to reach distant or high tree branches.

Unidirectional electric potentials maintained between the nozzle electrode assembly 20—39 and the outer nozzle 13, which are effective in giving the atomized spray oil droplets sufficient charge to minimize coalescence until they contact the leaves and limbs of the plant or tree being sprayed, may range from 10,000 to 25,000 volts. When employing these voltages, the sprayer apparatus may be equipped with the outer electrode 13 having an inner diameter of approximately 2½ inches. For higher voltages, it is necessary to increase the diameter of the nozzle 13 in order to prevent flash-over between the said outer nozzle 13 and spray nozzle 20. The diameter of the outer spray nozzle 13 is preferable that which will produce at the voltages employed a potential gradient of such value between the inner surface of the nozzle 13 and the outer surface of the nozzle 20 and rod electrode 39 that a persistent silent electric discharge or corona discharge is maintained therebetween without flash-over.

The spray liquid employed may be any spray liquid but preferably a paraffinic or aromatic oil, for example, an aromatic type of oil having a viscosity of approximately 50 seconds Saybolt at 100° F. Such an oil can be readily atomized and is of sufficient viscosity, particularly at the lower temperature encountered in the spraying seasons, to prevent substantial drainage from the leaves and branches.

The foregoing is merely illustrative of a preferred method and embodiment of the invention and is not to be considered limiting since many variations may be made by those skilled in the art within the scope of the appended claims.

I claim:

1. Coating apparatus comprising in combination a means to disperse finely divided coating material in a gas stream, a substantially annular electrode, a rod electrode of relatively small diameter positioned substantially coaxially within said annular electrode, means to maintain a corona discharge through the annular space between said electrodes and means to pass said gas stream carrying dispersed finely divided coating material through said corona discharge in said annular space.

2. A method of coating surfaces with finely divided coating material which comprises dispersing a finely divided coating material in a gas stream, passing said dispersed finely divided coating material through a corona discharge maintained between a rod electrode of relatively small diameter and a second electrode spaced from said rod electrode and dispersing the thus electrified finely divided coating material by a second gas stream and causing the thus dispersed material to contact the surface to be coated.

3. A method of coating plants with a spray liquid which comprises atomizing the spray liquid by a gas stream and immediately thereafter passing said atomized spray liquid through a corona discharge maintained between a rod electrode of relatively small diameter and a second electrode spaced from said rod electrode and dispersing the thus electrified spray liquid by a second gas stream thereby forming an electrified floating cloud of said spray liquid and causing said cloud of spray liquid to contact the plants to be sprayed.

4. Coating apparatus comprising in combination means to disperse finely divided coating material in a gas stream, a rod electrode of relatively small diameter, a second electrode spaced from said rod electrode and having a larger surface than said rod electrode, means to maintain a corona discharge between said electrodes and means to pass said gas stream carrying dispersed finely divided coating material through said corona discharge.

5. Coating apparatus comprising in combination means to disperse finely divided coating material in a gas stream, a rod electrode of relatively small diameter, a second electrode spaced radially around the axis of said rod electrode, means to maintain a corona discharge between said electrodes and means to pass said gas stream carrying dispersed finely divided coating material through said corona discharge.

6. Coating apparatus comprising in combination a means to disperse finely divided coating material in a gas stream, a substantially annular electrode, a rod electrode of relatively small diameter positioned substantially coaxially with respect to said annular electrode, means to maintain a corona discharge through the annular space between said electrodes and means to pass said gas stream carrying dispersed finely divided coating material through said corona discharge in said annular space.

HAROLD E. BRAMSTON-COOK.